(12) United States Patent
Dandekar (10) Patent No.: US 8,660,912 B1
(45) Date of Patent: Feb. 25, 2014

(54) ATTRIBUTE-BASED NAVIGATION OF ITEMS

(75) Inventor: Pranav Dandekar, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 1440 days.

(21) Appl. No.: 12/059,732

(22) Filed: Mar. 31, 2008

(51) Int. Cl.
*G06Q 30/00* (2012.01)
*G06Q 30/06* (2012.01)
*G06Q 30/02* (2012.01)

(52) U.S. Cl.
CPC ............ *G06Q 30/06* (2013.01); *G06Q 30/02* (2013.01)
USPC ........ 705/27.1; 705/26.1; 705/26.2; 705/27.2

(58) Field of Classification Search
None
See application file for complete search history.

(56) References Cited

U.S. PATENT DOCUMENTS

| | | | |
|---|---|---|---|
| 6,360,216 B1 * | 3/2002 | Hennessey et al. | 1/1 |
| 7,028,020 B1 * | 4/2006 | Keskar et al. | 1/1 |
| 7,197,479 B1 * | 3/2007 | Franciscus de Heer et al. | 705/26.62 |
| 2006/0064411 A1 * | 3/2006 | Gross et al. | 707/3 |
| 2008/0005118 A1 * | 1/2008 | Shakib et al. | 707/10 |
| 2008/0071763 A1 * | 3/2008 | Ferrenq et al. | 707/5 |
| 2009/0234849 A1 * | 9/2009 | Erera et al. | 707/6 |

OTHER PUBLICATIONS

Filing Receipt, Specification and Drawings of related U.S. Appl. No. 11/948,869, filed Nov. 30, 2007. Title: Multi-Layered Hierarchical Browsing. Inventors: Cyrus Khoshnevisan et al.
Filing Receipt, Specification and Drawings of related U.S. Appl. No. 11/540,933, filed Sep. 29, 2006. Title: Method and System for Displaying Attributes of Items Organized in a Searchable Hierarchical Structure. Inventors: Max L. Kanter et al.

* cited by examiner

*Primary Examiner* — Ryan Zeender
*Assistant Examiner* — Denisse Ortiz Roman
(74) *Attorney, Agent, or Firm* — Knobbe Martens Olson & Bear LLP (57) ABSTRACT

A method for exploring similar items can include receiving a request to explore items similar to an item identified by a user and retrieving a set of similar items to output for display to the user. The similar items can be similar to the identified item, and the set of similar items can include one or more attribute values for each similar item. In addition, in response to receiving a selection of one or more of the attribute values by the user, the method can further include retrieving similar items corresponding to the user-selected attribute values. Moreover, the method can include outputting at least a subset of the similar items for display.

20 Claims, 6 Drawing Sheets

ATTRIBUTE-BASED NAVIGATION OF ITEMS

BACKGROUND

In a typical network-based merchandising environment, a user can search for items (e.g., goods and/or services) within a category or group of items in an electronic item catalog. A catalog of items (including each item's description) may be organized in a browse tree structure in order to facilitate searching. As the name suggests, a "browse" tree permits users to browse through various items, which are logically arranged in the form of a hierarchical tree. Each node of the tree (a browse node) may be associated with a category of items in a hierarchical manner. Moreover, the browse tree may be displayed via a user interface as a collection of hyperlinks, each hyperlink corresponding and providing further access to a browse node of the tree. For example, the "root" or top node of a tree representing all items may have many browse nodes corresponding to categories such as "books," "electronics," "gourmet food," and the like. Each such browse node may have different child browse nodes representing sub-categories.

For example, a parent browse node such as "Camera & Photo" may have a number of child browse nodes such as "Digital Cameras," "Camcorders," and the like. Accordingly, to find an item within the Camera & Photo category, a user may select a hyperlink or other user interface control associated with the child browse node Digital Cameras. Selecting Digital Cameras may display a list of further child browse nodes or subcategories such as "Point-and-Shoot Digital Cameras." In turn, selecting Point-and-Shoot Digital Cameras may display a list of available point-and-shoot digital cameras for purchase. Selecting a particular camera can take a user to a specific display of information, e.g., price, availability, model, reviews, etc., for that camera. Such a display of information for an item may be referred to as an item detail display. In this manner, a user can search through a browse tree and locate the specific items of interest for purchase.

DETAILED DESCRIPTION

One drawback of finding items by browsing a hierarchical tree is that it can be difficult to browse for additional items once a user has reached an item detail display (e.g. a leaf node in the hierarchical tree). In particular, it can be difficult for the user to find similar items to the one the user is viewing. In order to do so, the user can use a "back" button of the user's browser to navigate to another branch of the browse tree. Navigating to another branch of the browse tree in this manner can take the user away from the item detail display. Without the information on the detail display in front of the user, the user may find it difficult to compare other items to the current item.

Thus, in certain embodiments, systems and methods are provided for navigation of an electronic catalog, collection or database of items (referred to herein interchangeably as a "catalog") that enable a user to explore items similar to the current item without requiring re-navigating the browse tree. For example, the item detail display for the current item may be configured to include, for instance, a hyperlink or other user interface control to explore similar items. By selecting this hyperlink and proceeding directly to a display of similar items (which may be displayed concurrently with the item detail display or separate from the item detail display), in certain embodiments the user may be able to find similar items without re-navigating the browse tree. Similar items can also be displayed in the context of the original item detail display accessed by the user for ease of item comparison.

For purposes of illustration, the methods or processes disclosed herein are described in the context of a system that enables users to browse a catalog of items maintained by a network resource such as an e-commerce web site. However, the disclosed processes can also be used in other types of systems, and can be used to browse other types of items whether or not in an e-commerce environment, such as but not limited to web sites, documents, news articles, blogs, podcasts, travel destinations, service providers, other user's content (e.g., websites, social profiles, etc.), events, discussion boards, photos and other images, videos, tagged items, and user-generated lists of items. In addition, the disclosed processes need not be implemented as part of, or in conjunction with, a network resource such as a web site.

In addition, as used herein, the term "item" is used interchangeably to refer to an item itself (e.g., a particular product) and to its description or representation in an electronic catalog system. As will be apparent from the context in which it is used, the term is also sometimes used herein to refer only to the item itself or only to its representation in the catalog system.

These systems and methods will now be described with reference to the drawings summarized above. Throughout the drawings, reference numbers may be re-used to indicate correspondence between referenced elements. The drawings, associated descriptions, and specific implementation are provided to illustrate embodiments of the inventions described herein and not to limit the scope thereof.

In addition, methods and processes described herein are not limited to any particular sequence, and the blocks or states relating thereto can be performed in other sequences that are appropriate. For example, described blocks or states may be performed in an order other than that specifically disclosed, or multiple blocks or states may be combined in a single block or state. Moreover, the various modules of the systems described herein can be implemented as software applications, hardware and/or software modules, or components on one or more computers, such as servers. While the various modules are illustrated separately, they may share some or all of the same underlying logic or code.

Figure 1:
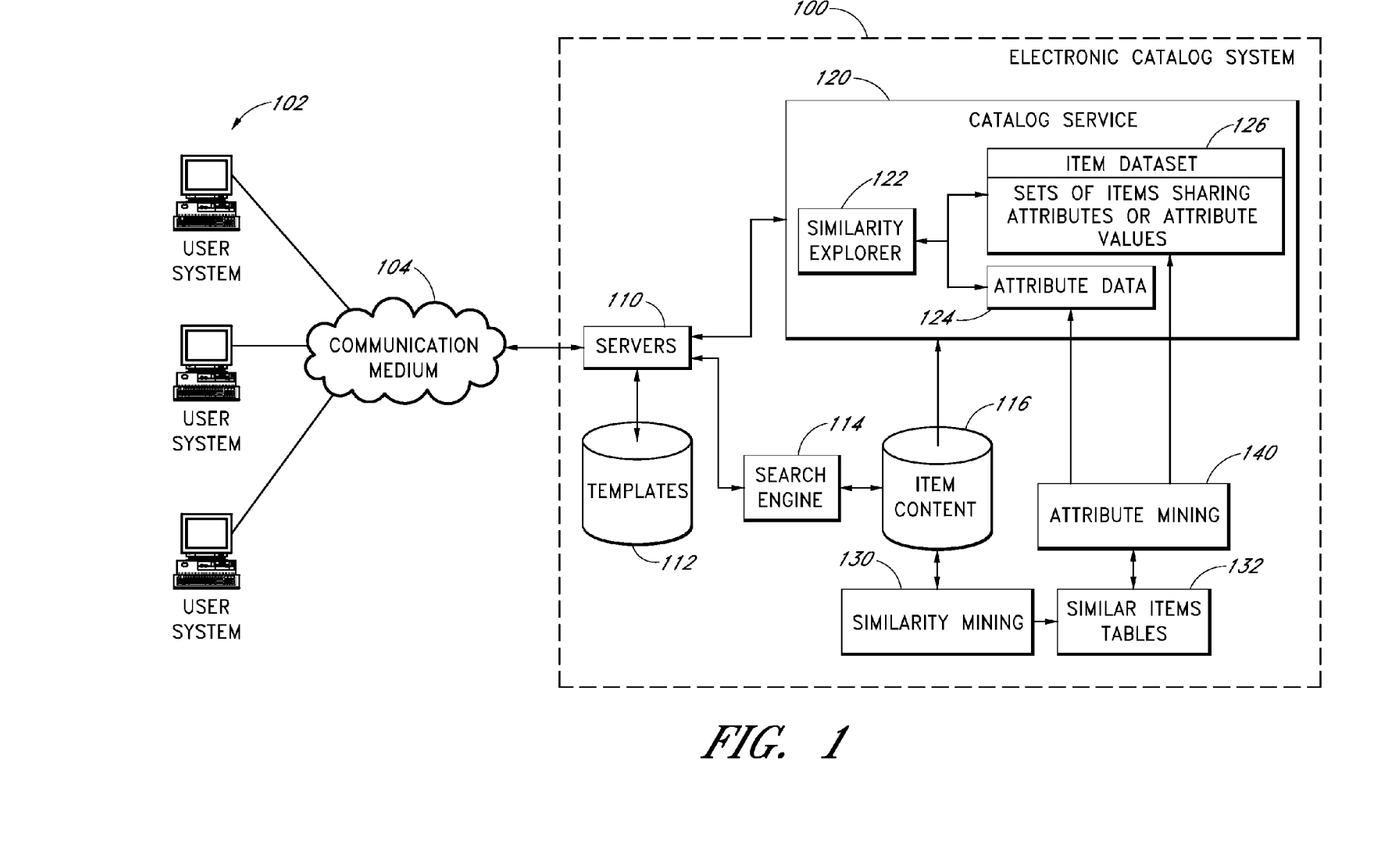
FIG. 1 is a block diagram of an illustrative electronic catalog system.

Turning to FIG. 1, an embodiment of an electronic catalog system 100 is shown. The electronic catalog system 100 can be used as a network resource, such as an e-commerce web site, a library catalog, a social networking site, a news web site, or the like. Accordingly, in certain embodiments the electronic catalog system 100 enables browsing of similar items in an electronic catalog directly from an item detail display or other origination point associated with the item, for example, an image of the item on a search results page.

The electronic catalog system 100 may include functionality for users of one or more user systems 102 to perform various types of item-related actions. For example, in embodiments where the electronic catalog system 100 is used as an e-commerce web site, users may be able to browse items, purchase items, tag items, add items to personal wish lists and shopping carts, receive personal recommendations, rate items, review items, combinations of the same, and the like. As shown in FIG. 1, the system 100 can be accessed by the users via one or more user systems 102 over a communications medium 104 such as the Internet. Although shown as personal computers for purposes of illustration, the user systems 102 may include various other types of computing devices, such as web pads, personal digital assistants (PDAs), mobile phones, set-top television boxes, media players, laptop computers, tablets, desktop computers, electronic book readers, and the like.

The system 100 includes one or more servers 110 for communicating with the user systems 102 over the communications medium 104. These servers 110 can be web servers in some embodiments. As web servers, the servers 110 can process Hypertext Transfer Protocol (HTTP) and other protocol requests received over the communications medium 104 from the user systems 102, which may be running web browser software or the like. Additional protocols and components for providing communication between the user systems and servers via the communication medium 104 may be provided in various implementations.

In response to requests from the user system(s) 102, the servers 110 can dynamically generate content by accessing a repository of templates 112, which can include display templates that specify the layout and format of user interface displays such as web pages, widgets, iframes, combinations of the same, and the like. Example user interface displays that can be accessed by the user systems 102 with the servers 110 include search engine displays, catalog displays, item detail displays, similar items displays, recommendation displays, and the like. The servers 110 can populate these templates with information that may be dependent on the particular user system 102 accessing a template, as may be determined, for example, using browser cookies or a login procedure.

The servers 110 of the electronic catalog system 100 can retrieve detailed information for particular items from a catalog service 120, which includes or accesses a repository of item content 116. The item content may include (in the example embodiments where items are products) product photos, reviews, ratings, price and availability data, and other types of descriptive information about particular products that are available to purchase, rent, download, review, post for sale, and the like via the electronic catalog system 100.

Items in the catalog (not shown) can be arranged in a hierarchy, according to categories and subcategories. Each category and subcategory can be referred to as a browse node in the hierarchy. In a typical scenario, a user can browse items in the catalog by navigating through the hierarchy. For example, the user might start at the top or broadest category in the hierarchy, which may be "all items." From there, the user might browse through successively-narrower categories deeper in the hierarchy until the user selects an item to view. Upon selecting the item, the user can be presented with an item detail display that presents details about the particular item. In the case of product items, the item detail display might include product pricing information, shopping cart options, product reviews, and so on. The foregoing examples of detailed information that may be displayed for an item are merely illustrative, and thus should not be construed as limiting.

In addition to accessing item detail displays through browsing the catalog, users may also be able to access item details by querying a search engine 114 or the like. The search engine 114 can in turn query the item content repository 116 and return a list of search results. From the search results, the user can select an item and be taken to the item's detail display.

As described above, a user viewing an item detail display may not be able to easily browse similar items in the electronic catalog. In particular, if a user wishes to compare the item he or she is currently viewing on the item detail display with another similar item, the user generally returns to a higher level of the item hierarchy and browses down another branch of the hierarchy to find another item. Alternatively, the user can enter a new query into a search engine. Both of these approaches can waste the user's time and cause the user to lose the context of the initial item detail display, making item comparisons difficult.

In certain embodiments, the catalog service 120 of the electronic catalog system 100 includes a similarity explorer 122 that enables users to explore items that are similar to an item identified on an item detail display. The similarity explorer 122 may be a component or module that can be initiated by one or more user systems 102 to explore similar items in the catalog. In one embodiment, a user system 102 viewing an item detail display may request similar items by accessing the similarity explorer 122 via a hyperlink or other user interface control. In response, the similarity explorer 122 can provide options for exploring similar items without requiring the user to return to a higher level in the browse tree.

The similarity explorer 122 may also be accessed from displays other than item detail displays in certain embodiments. The similarity explorer 122 may, for instance, be accessed wherever items are identified or displayed (e.g., with text or a picture). Examples of displays from which the similarity explorer 122 may be accessed include user-generated lists of items such as wish lists or the like, search results displays, recommendations displays, catalog hierarchy displays, shopping cart displays, order status displays, and the like.

In response to a request for similar items, the similarity explorer 122 may retrieve attribute data 124 for items similar to the item of the item detail display. The attribute data 124 may include a list of attributes of the similar items and values of the attributes. The attributes can include the characteristics or properties which the similar items have or with which they are associated. For example, attributes for a "digital camera" item might include "brand," "megapixels," "zoom," "price," and the like. An attribute value, on the other hand, can include a specific value of an attribute for a given item. Attribute values of the attribute "brand" might include, for example, Kodak™, Nikon™, Canon™, and the like.

The similarity explorer 122 can output the attributes and the attribute values for display to the user in the form of a list, tag or text cloud, tree, table, or the like. The user may then select one or more of the attribute values to request similar items having those attribute values. In the example of a digital camera item, the user may select, for instance, a particular zoom attribute value (e.g., 10 times zoom) and a particular megapixel attribute value (e.g., 7.1 megapixels).

The request for similar items may be received by the similarity explorer 122. In response to receiving the request, the similarity explorer 122 can retrieve items that share the user-selected attribute values from an item dataset 126. The item dataset 126 in certain embodiments includes sets of items that share one or more attributes or attribute values. As used herein, in addition to having its broad ordinary meaning, a "set" may include one or more items, attributes, attribute values, or the like. Accordingly, a set is not limited to a plurality of members. The sets of items may be stored in one or more tables or the like. In response to retrieving the items from the item dataset 126, the similarity explorer 122 can output the retrieved items for display to the user. Thus, in the above digital camera example, the similarity explorer 126 might return items having the user-selected zoom attribute value (e.g., 10 times zoom) and megapixel attribute value (e.g., 7.1 megapixels). Example displays for exploring similar items are described with respect to FIGS. 4-6 below.

The attribute data 124 and the item dataset 126 may be generated as follows. In certain embodiments, a similarity mining module 130 may access data in the item content repository 116 to detect similarities or associations between items. For each item in the electronic catalog (or a subset thereof), the similarity mining module 130 may generate a set of similar items and store these items in one or more similar items tables 132. Thus, the similar items tables 132 may include item-to-item mappings that map similar items to one another. The item-to-item mappings may be ranked or otherwise scored to indicate degrees of similarity between the items. The generation of the similar items is described in more detail below with respect to FIG. 2.

An attribute mining module 140 may analyze data in the similar items tables 132 to generate the attribute data 124 and the item dataset 126. Using the data in the similar items tables 132, the attribute mining module 140 can determine, for a given item, which attributes and attribute values the items similar to the given item may have. The attribute mining module 140 may determine the attributes and their values for the items in the similar items tables 132 by examining their item descriptions in the item content repository 116. The attribute mining module 140 may, in certain embodiments, analyze a subset of the items that are similar to the given item by selecting similar items having a score above a certain threshold. The attribute mining module 140 can store the mined attributes and attribute values for the given item in the attribute data 124. The attribute mining module 140 may perform this analysis for each of the items in the similar items tables 132 or for a subset thereof.

To generate the item dataset 126, the attribute mining module 140 may, for a given item in the similar items tables 132, create attribute value sets of similar items that each shares a common attribute value. For example, if the given item is a digital camera, one attribute value set might include digital cameras that have the same megapixel rating, another attribute value set might include digital cameras that have the same price, and so on. Thus, if a user viewing a digital camera requests similar items that have 7.1 megapixels, the similarity explorer 122 may retrieve the attribute value set of similar items sharing the 7.1 megapixels attribute value.

The attribute value sets and other sets of items described below may be pre-generated by the attribute mining module 140. The pre-generation of these sets by the attribute mining module 140 may be performed, for example, on a periodic or aperiodic basis during off-peak processing times. In some embodiments, the attribute mining module 140 generate sets concurrently with other actions being performed by the electronic catalog system 100. For example, the attribute mining module 140 may generate or update the sets once daily but may also update more or less frequently in certain implementations. Pre-generation of sets can enable the similarity explorer 122 to retrieve similar items more efficiently in certain implementations.

If a user requests similar items having multiple attribute values for a single attribute (e.g., 3× Zoom and 10× Zoom), the similarity explorer 122 may retrieve the corresponding attribute value sets. Alternatively, the attribute mining module 140 may pre-generate combination sets of items by performing unions of attribute value sets that share the same attribute. The similarity explorer 122 can then directly access a combination set when multiple attribute values are selected by a user. Pre-generating the combination sets can facilitate the similarity explorer 122 more efficiently retrieving similar items.

In addition, a user may also request similar items having attribute values of multiple attributes (e.g., 3× Zoom and 5 Megapixels). The similarity explorer 122 may then retrieve items by intersecting the corresponding attribute value sets. Alternatively, the attribute mining module 140 may pre-generate additional combination sets by performing intersections between attribute value sets. In addition, the attribute mining module 140 may pre-generate additional combination sets by taking intersections of combination sets, or of combination sets (generated by unions) and attribute value sets. Thus, combination sets can be pre-generated by performing unions and/or intersections of sets of items, or the similarity explorer 122 can dynamically generate unions and/or intersections of sets of items. Further example implementation details on generation of combination sets are described below with respect to FIG. 2.

The similarity and attribute mining modules 130,140 may operate in off-line processes. These off-line processes may be performed, for example, on a periodic or aperiodic basis during off-peak processing times. In addition, while the similarity and attribute mining modules 130, 140 may mine data off-line, these modules 130, 140 may also mine data concurrently with other actions being performed by the electronic catalog system 100. For example, the attribute mining module 140 may update the attribute datasets 124 once daily but may also update more or less frequently in certain implementations.

Figure 2:
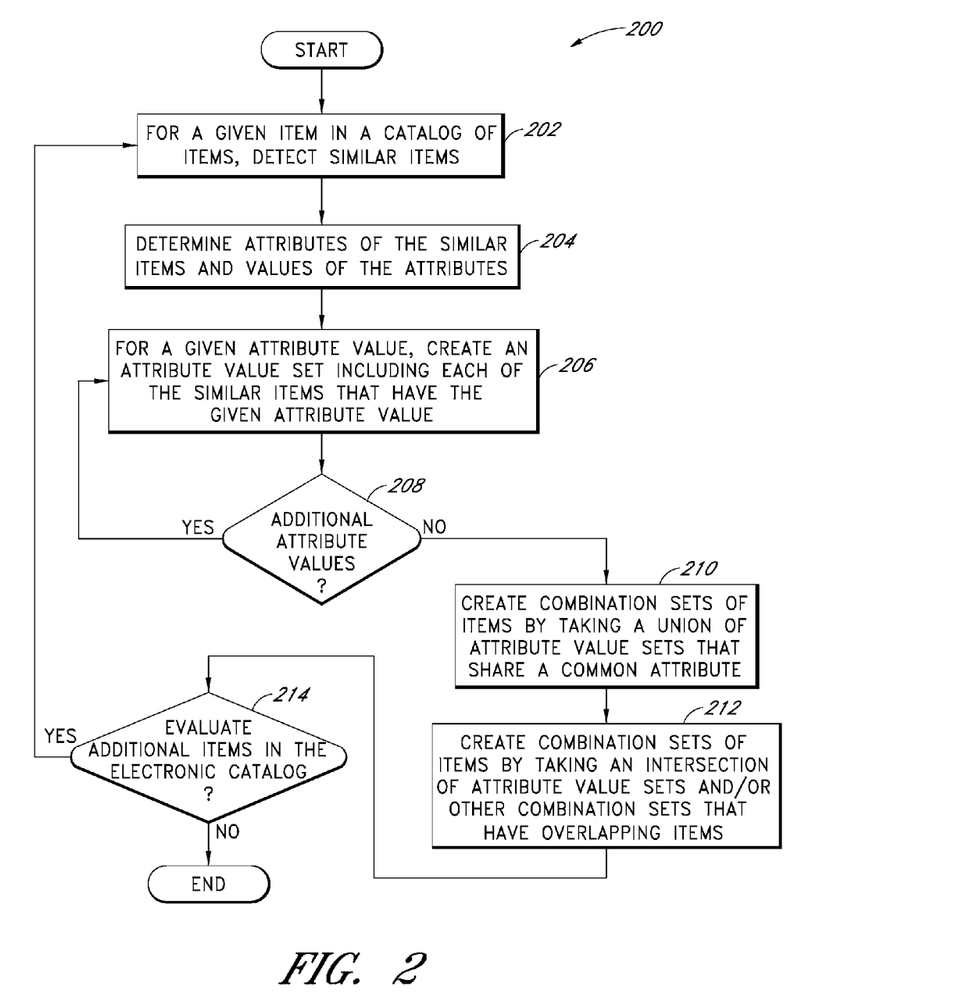
FIG. 2 is a flow diagram of an illustrative process for generating attribute datasets for an item using the electronic catalog system of FIG. 1.

Turning to FIG. 2, an embodiment of a process 200 is shown for generating attribute data and item datasets that can be used to browse for similar items by a user. As described above, attribute data can include lists of attributes and attribute values, while item datasets can include attribute value sets and combination sets. The process 200 may be implemented by a computer system, such as the electronic catalog system 100 of FIG. 1. In particular, certain aspects of the process 200 can be implemented by the similarity mining module 130 and the attribute mining module 140 described above.

At block 202, for a given item in a catalog of items, similar items may be detected. This block 202 may be performed in certain embodiments by the similarity mining module 130. Several techniques may be used to detect similar items. In one embodiment, similar items can be detected by determining a category in a browse tree that the given item is in and using other items in the same category as similar items. Alternatively, the attributes of the given item can be used as a search query or part of a search query submitted to a search engine, such as the search engine 114 described above. The results of the search query can include items that may be considered to be similar with the given item. For example, a subset of the search results may be used as the set of similar items. The subset may be determined by taking items having a search result score exceeding a threshold. Based on the results of the search query, the items may receive similarity scores or the like that correspond to their search result ranking or search result score. The similar items generated by either the category-based technique or search engine-based technique may be mapped to the given item and stored in the similar items table 132 described above.

Another technique for detecting similar items includes detecting and quantifying similarities between items based on users' item selection (e.g., purchase) and/or item viewing behavior. For instance, in embodiments where items are products, item A may be mapped to item B in a purchase-based similar items table if a relatively large number of the users who purchased item A also purchased item B. Additional example implementations of constructing similar items tables may be found, for example, in U.S. Patent Publication No. 2002/0010625 to Smith, entitled "Content Personalization Based on Actions Performed During a Current Browsing Session," filed Jan. 24, 2002.

The remaining blocks 204-214 in the process 200 may be performed by the attribute mining module 140. At block 204, attributes and attribute values of the similar items may be determined. The attributes and their values can be determined, for example, by examining item descriptions of the similar items in the item content repository 116.

For a given attribute value, at block 206 an attribute value set is created that includes each of the similar items that have the given attribute value. The attribute value set can be in the form of a database table or portion thereof or some other data structure. As an illustration, an attribute value set of books having the attribute value of "Mark Twain" in the attribute "author" might include all or a subset of all books in the electronic catalog by Mark Twain. Likewise, an attribute value set of digital cameras having the attribute value of "7.1 megapixels" might include all or a subset of all digital cameras in the electronic catalog having 7.1 megapixels.

At decision block 208, it is determined whether additional attribute values exist in the set of similar items. If so, the process 200 returns to block 206, where additional attribute value sets may be created. If not, the process 200 continues to decision block 210, where combination sets of items are created. In the depicted embodiment, combination sets are created at block 210 by taking a union of attribute value sets that share a common attribute. All possible unions may be taken in one embodiment to produce a plurality of combination sets. Fewer than all possible unions may be taken in other embodiments.

If multiple attribute value sets or combination sets have overlapping items, the overlapping items share the attribute values of both sets. Thus, at block 212, additional combination sets are created by taking an intersection of attribute value sets and/or other combination sets that have overlapping items. All possible intersections may be taken in one embodiment to produce a plurality of combination sets. Fewer than all possible intersections may be taken in other embodiments.

Once the combination sets have been created, the process 200 may continue to decision block 214, where it is determined whether additional items in the electronic catalog are to be evaluated. If so, the process 200 returns to block 202. Otherwise, the process 200 ends. Thus, the process 200 may continue for multiple items in an electronic catalog, including up to all items or a subset thereof in certain embodiments.

While the process 200 illustrates the creation of pre-generated intersection sets, in certain embodiments unions and/or intersections between attribute value sets are instead detected in response to a request for similar items from a similarity explorer module or the like. Likewise, items sharing common attribute values may be requested by a similarity explorer module or the like without pre-generating the attribute value sets. However, pre-generating attribute value and/or intersection sets can beneficially allow more efficient and scalable retrieval of similar items in certain implementations.

Figure 3:
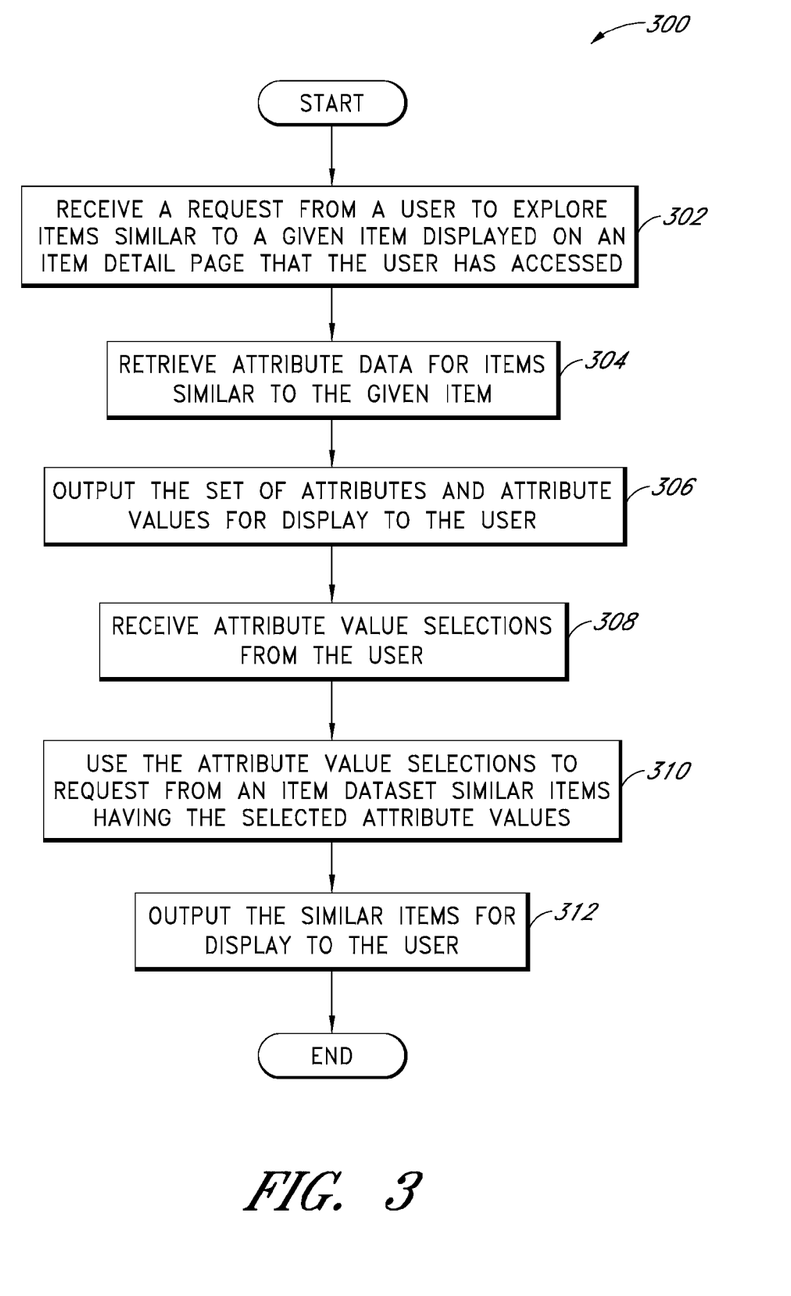
FIG. 3 is a flow diagram of an illustrative process for providing attribute-based navigation of items from an item detail display using the attribute value sets of FIG. 2.

FIG. 3 illustrates an example embodiment of a process 300 for providing attribute-based navigation of similar items to a given item displayed on an item detail display. Like the process 200, the process 300 can be implemented by an electronic catalog system, such as the electronic catalog system 100 of FIG. 1. In particular, the process 200 may be implemented by the similarity explorer 130 described above. The process 300 can use the item datasets described above to enable users to browse similar items from an item detail display.

At block 302, a request may be received from a user to explore items similar to a given item displayed on an item detail display that the user has accessed. The request may come from a user computer system, such as a user system 102 or the like. The request may originate, for example, by the user selecting a hyperlink or other user interface element to explore similar items.

Figure 4:
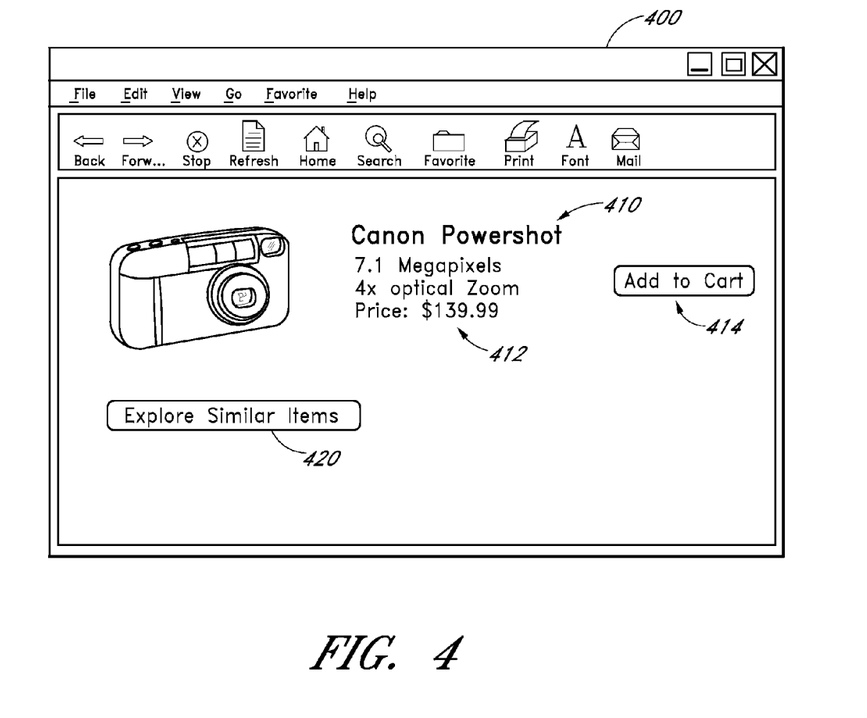
FIGS. 4 through 6 illustrate example user interface displays for browsing items that are similar to an item displayed on an item detail display.

To illustrate, FIG. 4 depicts an example item detail display 400. The item detail display 400 can be generated, for example, using a server such as the server 110. The item detail display 400 includes item details 412 for an item 410, which in the depicted example, is a digital camera. The item details 412 for the digital camera include its brand ("Canon™"), model ("Powershot™"), zoom ("4× optical"), and price ("$139.99"). The item detail display 400 also includes an "Add to Cart" control 414, which when selected, can add the item 410 to a user's electronic shopping cart.

The item detail display 400 further includes an "explore similar items" control 420. The control 420 is depicted as a button in the example embodiment but may be another user interface element, such as a hyperlink, in other embodiments. Selecting the explore similar items control 420 can cause a computer system, such as the electronic catalog system 100, to provide an interface for exploring similar items (see, e.g., FIGS. 5-6). In alternative embodiments, such an interface for exploring similar items may be automatically provided on the item detail display 400 without a user requesting the interface.

Referring again to FIG. 3, at block 304, attribute data for items similar to the given item (e.g., the item 410) may be retrieved. The attribute data may include a list of attributes and attribute values that may be generated, for example, by the attribute mining module 140. At 306, the attribute data may be output for display to the user. The user can then select attributes or attribute values to obtain a listing of similar items.

Figure 5:
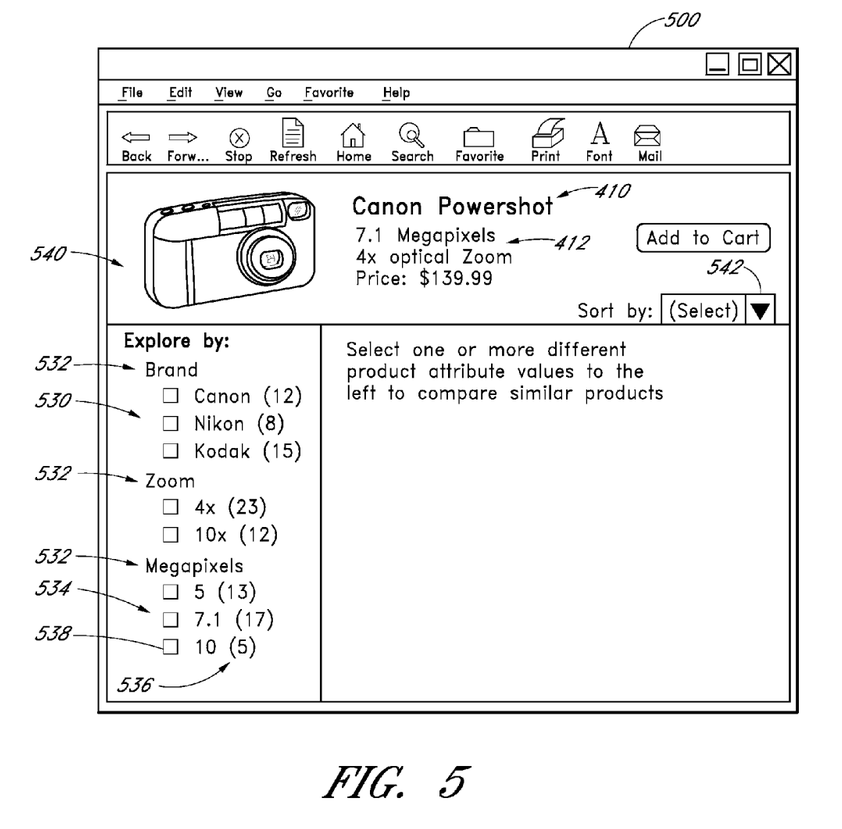

An example of attribute data is shown in FIG. 5, which illustrates an example similarity explorer display 500. The similarity explorer display 500 may be reached by selection of the "explorer similar items" control 420 of FIG. 4. The similarity explorer display 500 is illustrated as a separate web display from the item detail display 400 of FIG. 4. However, in certain embodiments, the similarity explorer display 500 can be displayed concurrently with the item detail display 400. For example, the similarity explorer display 500 may be displayed in a pop-up window from the item detail display 400, another frame of the item detail display 400, on another area of the item detail display 400, or the like. In various embodiments, the similarity explorer display 500 is instead implemented as a widget or the like on the item detail display 400.

To the left of the display 500, attribute details 530 are shown. The location of the attribute details 530 on the display 500 can be varied. The attribute details 530 include attributes 532 and attribute values 534. The example attributes 532 shown are Brand, Zoom, and Megapixels. Example attribute values 534 for the Brand attribute 532 include Canon™, Nikon™, and Kodak™. In the example embodiment, next to each attribute value 534 is a numerical value 536 that represents a number of items in an attribute value set. Thus, the number "12" next to the attribute value 534 "Canon™" indicates that an attribute value set includes twelve items (e.g., digital cameras) that each share the Canon™ attribute value.

A checkbox control 538 is positioned next to each attribute value 534. The checkbox controls 538 are examples of user interface controls that may be used to select a particular attribute value. In the depicted embodiment, multiple checkbox controls 538 can be selected, so that a user can find similar items based on multiple attribute values 534. Other user interface controls may be used in place of checkboxes in other embodiments, such as hyperlinks, buttons, radio buttons, drop-down lists, combinations of the same, and the like.

The display order of the attributes 532 may be generated dynamically in certain embodiments. The depicted display order shows the attribute 532 "Brand" at the top, followed by "Zoom" and "Megapixels." This display order may be generated, for example, according to which attribute 532 may be most popular with users. The popularity of a given attribute 532 may be determined by analyzing user behavior; for example, if an analysis of user online behavior (e.g., browse behavior, purchase behavior, and/or user clickstream data) indicates that users prefer to shop by brand, the "Brand" attribute 532 may be displayed before other attributes 532.

Another way to determine the display order of the attributes 532 is to determine the number of similar items having a given attribute 532. If one attribute 532 has more similar items than another, the first attribute 532 may be displayed higher. Additionally, attribute 532 display order can be based on the similarity scores of the similar items. For example, attributes 532 of items having higher similar scores might be displayed before attributes 532 of items with lower similarity scores. Further, attribute 532 display order can also be based on the category in which the item 410 is in. Moreover, some combination of the foregoing factors may be used to determine attribute 532 display order. In addition, other types of attribute detail 530 displays, such as tag clouds, might emphasize attributes differently. For example, in a tag cloud, some attributes might have larger fonts than others to emphasize those attributes.

In the depicted embodiment, the item 410 and its item details 412 from the item detail display 400 are also included on the display 500. In particular, the item details 412 are in an item detail area 540 of the display 500. Keeping the item details 412 on the similarity explorer display 500 (or conversely, providing attribute details 530 on the item detail display 400) enables a user to select attribute values 534 that can be used to compare items with the item represented by the item details 412. In other embodiments, however, the item details 412 need not be included on the similarity explorer display 500.

A sorting control 542 is also provided in the depicted embodiment. The sorting control 542 is shown in the form of a drop-down box, although other user-interface elements may be used for the sorting control 542. The sorting control 542 enables a user to sort similar items according to one or more sorting criteria. The available sorting criteria may be dynamically generated based at least in part on the attributes 532 or attribute values 534 of the similar items. The sorting criteria may include any attributes 532 that do not receive attribute value 534 selections by a user, as will be illustrated below with respect to FIG. 6.

Referring again to FIG. 3, attribute value selections from the user are received at block 308. Using the attribute value selections, at block 310 similar items can be requested from an item dataset. This block 308 can include accessing one or more attribute value sets or combination sets in the item dataset. At block 312, the similar items are output for display to the user.

Figure 6:
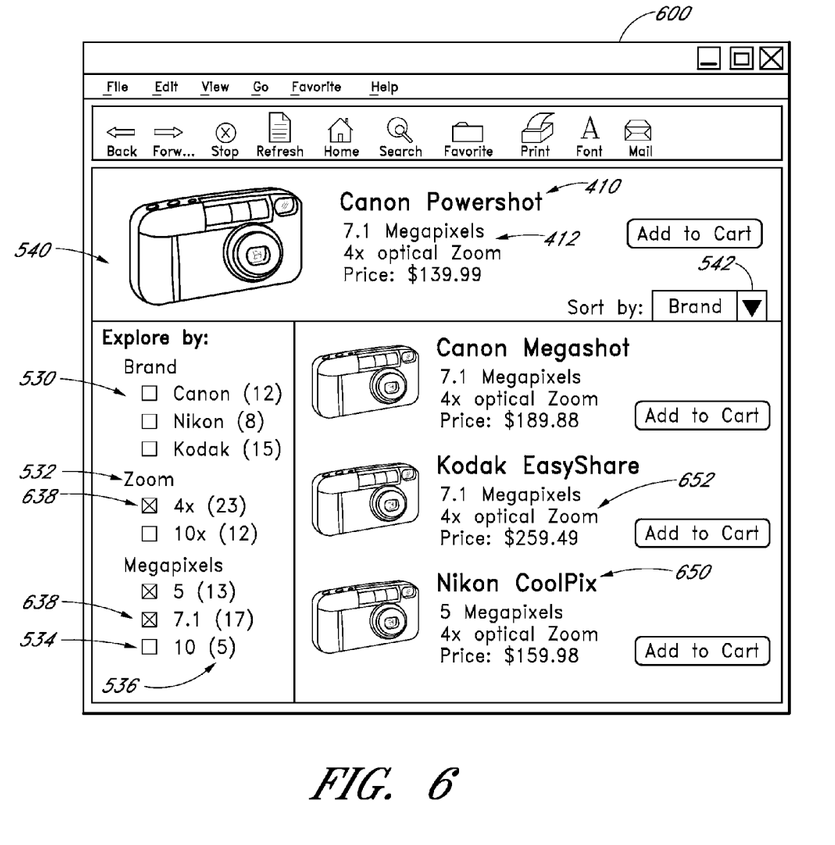

One such example similarity explorer display 600 is shown in FIG. 6. The similarity explorer display 600 may be reached by selection of one or more attribute values 534 in the display 500 of FIG. 5. The similarity explorer display 600 is illustrated as a separate web display from the item detail displays 400, 500 described above. However, in certain embodiments, the similarity explorer display 600 is displayed concurrently with the item detail display 400. In addition, in various embodiments, the similarity explorer display 600 may be instead implemented as a widget or the like on the item detail display 400.

The similarity explorer display 600 illustrates three checkbox controls 638 that have been selected by a user. These checkboxes 638 correspond to the attribute value 534 "4×" under the attribute 532 "Zoom," as well as the attribute values 534 "5" and "7.1" under the attribute 532 "Megapixels."

Because attribute values 534 have been selected from different attributes 532, a pre-generated combination set may be accessed to obtain the similar items. Alternatively, a union of the attribute value sets for "5" and "7.1" Megapixels may be taken. The resulting set of items may then be intersected with the attribute value set for "4× Zoom." In the depicted embodiment, similar items 650 have been retrieved and displayed according to the user's selections. In the depicted embodiment, three items 650 having item details 652 are shown for ease of illustration; the actual set of similar items 650 may be more. Controls may be provided in certain embodiments for navigating through multiple displays of similar item 650 results. The item details 652 are in the same format as the item details 412, facilitating ease of comparison between the items 650 and the item 410. The formats of the item details 412, 650 may vary in various embodiments.

In certain embodiments, a user may obtain similar items 650 that are more similar to the item 410 on the item detail display 400 by selecting attribute values 534 that are the same as the attribute values of the item 410. A user may obtain similar items 650 that are less similar to the item 410 by changing one or more of the attributes. For example, in the depicted display 600, a user has selected 4× zoom, which is the same as the item's 410 zoom value, but the user has selected a different megapixel rating than the item's 410 megapixel value. As a result, the display shows item details 652 that may be less similar than other items having the same attributes as the item 410. In various embodiments, selecting similar or dissimilar attribute values 534 to the item's 410 attribute values can enable a user to more easily compare the items 650 with the item 410.

As mentioned above, a sorting control 542 is provided having sorting criteria that may be dynamically generated based on any attributes 532 that do not have attribute values 534 selected by the user. The attribute 532 "Brand," for example, does not have an attribute value 534 selected by the user; thus, this attribute 532 may be used to sort the items 650 in an embodiment. Other example attributes that are not shown but which may be used to sort the items 650 include price, date of release, ratings, and the like. Where the attributes 532 are ordered according to the criteria described above with respect to FIG. 5, the sorting control 542 defaults to the first listed attribute 532 in an embodiment.

A user can use the sorting control 542 to more readily compare similar items 652 to the item 410. For example, a user might select attribute values 534 that are the same as the item's 410 attribute values. Then, the user can sort the resulting similar items 650 by the attributes 532 that have different attribute values 534 among the similar items 650. To illustrate, a user might wish to find a Nikon™ camera that is exactly like a Canon™ camera (e.g., the item 410) that the user is looking at in terms of features and that is closest on price point. The user might select the same attribute values 534 as the Canon™ camera and then sort on brand to find similar Nikon™ cameras or price to find the cheapest similar Nikon™ camera.

As another example, a user might own an album by a particular artist and wish to know if that artist recently released a new album. The user could then find all albums by that artist from an item detail display and sort similar items based on date of release. As yet another example, a user may be looking for a biography on Albert Einstein. The user may know that a particular author wrote such a biography recently but may wish to find other biographies written on Einstein to compare them. The user could find the particular biography he is familiar with and then search for similar items having the same genre (biography), the same person who is the subject of the biography (Einstein), and the like. The user might then sort the similar item results by author, price, ratings, or the like to compare the various works.

Conditional language used herein, such as, among others, "can," "could," "might," "may," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. In addition, the term "e.g." is used herein to illustrate example embodiments or implementations.

Each of the processes, components, and algorithms described above may be embodied in, and fully automated by, code modules executed by one or more computers or computer processors. The code modules may be stored on any type of computer-readable medium or computer storage device. The processes and algorithms may also be implemented partially or wholly in application-specific circuitry. The results of the disclosed processes and process steps may be stored, persistently or otherwise, in any type of computer storage. In one embodiment, the code modules may be configured to execute on one or more processors, including subprocessors. In addition, the code modules may comprise, but are not limited to, any of the following: software or hardware components such as software object-oriented software components, class components and task components, processes methods, functions, attributes, procedures, subroutines, segments of program code, drivers, firmware, microcode, circuitry, data, databases, data structures, tables, arrays, variables, combinations of the same, and the like.

The various features and processes described above may be used independently of one another, or may be combined in various ways. All possible combinations and subcombinations are intended to fall within the scope of this disclosure. In addition, certain method or process steps may be omitted in some implementations.

While certain embodiments of the inventions disclosed herein have been described, these embodiments have been presented by way of example only, and are not intended to limit the scope of the inventions disclosed herein. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

The invention claimed is:

1. A system for providing similar items to a user of an electronic catalog, the system comprising:
   a similarity mining module configured to detect similarities between items in an electronic catalog and create one or more sets of similar items, each set of similar items corresponding to an item in the electronic catalog;
   an attribute mining module configured to analyze each set of similar items to detect common attribute values of the similar items and to create an item data set comprising sets of items sharing one or more attribute values; and
   a similarity explorer module comprising computer hardware, the similarity explorer module accessible by a user from an item detail display of a first item selected by the user, the similarity explorer module configured to:
      output a plurality of attribute values of similar items to the first item wherein the outputted plurality of attribute values are descriptive of actual characteristics of the similar items and are displayed independently of any listing of the similar items themselves, and wherein the similarity explorer display includes an item detail area comprising information describing characteristics of the first item;
      output, together with the plurality of attribute values, a plurality of attribute selection controls, the attribute selection controls being selectable by the user to select one or more of the attribute values;
      receive one or more selections of the attribute selection controls made by the user, thereby receiving an indication of one or more of the attribute values selected by the user;
      retrieve, in response to receiving the one or more selections of the attribute selection controls, a subset of the similar items that are similar to the first item and that share the one or more selected attribute values; and
      output the subset of the similar items, thereby enabling the user to visually compare the first item with the subset of similar items.

2. The system of claim 1, wherein the item detail display comprises a display accessed by selection of an item on a search results display or browse tree display.

3. The system of claim 1, wherein the item dataset comprises combination sets, each combination set comprising items from intersecting attribute value sets or a union of attribute value sets.

4. The system of claim 1, wherein the similarity explorer module is further configured to provide options for ranking the set of similar items according to an attribute of the similar items.

5. A method, the method comprising:
   by a computer system comprising computer hardware:
      receiving a request to access an item detail display descriptive of a first item in an electronic catalog;
      outputting the item detail display for presentation to a user, the item detail display comprising information describing characteristics of the first item;
      identifying and retrieving for display to the user a set of items similar to the first item, wherein the set of similar items includes a plurality of attribute values descriptive of actual characteristics of the similar items;

outputting for presentation on a similarity explorer display the plurality of attribute values descriptive of the actual characteristics of the similar items such that the outputted plurality of attribute values are displayed independently of any listing of the similar items themselves, the similarity explorer display including an item detail area comprising information describing characteristics of the first item;

outputting for presentation on the similarity explorer display, together with the plurality of attribute values, a plurality of attribute selection controls, wherein user selection of one or more of the attribute selection controls causes the similarity explorer display to output items in the set of similar items that have the selected one or more attribute values.

6. The method of claim 5, further comprising ranking the similar items according to one of the attributes of the similar items.

7. The method of claim 5, wherein retrieving similar items comprises accessing an item dataset comprising one or more attribute value sets of items.

8. The method of claim 7, wherein accessing the item dataset comprises accessing a combination set comprising items from one or more of intersecting attribute value sets and a union of attribute value sets.

9. The method of claim 5, wherein the item dataset is pre-generated.

10. The method of claim 5, wherein receiving the request to explore items similar to an item identified by the user comprises receiving the request from an item detail display or search results display.

11. The method of claim 10, wherein the item detail display comprises a display accessed by selection of an item on a search results display or browse tree display.

12. The method of claim 10, wherein outputting at least a subset of the similar items for display comprises outputting at least a subset of the similar items concurrently with the item detail display.

13. The method of claim 5, wherein the computer system comprises a plurality of computing devices.

14. The method of claim 5, further comprising:
outputting on the item detail display a similarity explorer control, the similarity explorer control being selectable by the user to cause the computer system to output items similar to the first item on the item detail display for the user to compare with the first item;
receiving a user selection of the similarity explorer control from the item detail page; and
in response to the user selection of the similarity explorer control, outputting for presentation to the user the similarity explorer display.

15. The method of claim 5, further comprising:
receiving a selection by the user of one or more of the attribute values;
in response to receiving the selection, retrieving for display to the user a second set of items similar to the first item, the items in the second set of similar items having the selected one or more attribute values; and
outputting for display on the item detail page at least a subset of the second set of similar items.

16. A non-transitory computer readable storage medium having computer executable components for providing items similar to a first item identified by a user, the computer executable components comprising:
a similarity component configured to create one or more sets of similar items, each set of similar items corresponding to a first item identified by a user;
an attribute component configured to analyze each of the one or more sets of similar items to detect attribute values common to the similar items; and
a similarity explorer component, the similarity explorer component configured to:
output for presentation to the user a plurality of attribute values of similar items to the first item, wherein the outputted plurality of attribute values are descriptive of actual characteristics of the similar items and are displayed independently of any listing of the similar items themselves;
output for presentation to the user, together with the plurality of attribute values, a plurality of attribute selection controls, the attribute selection controls being selectable by the user to select one or more of the attribute values;
output for presentation to the user, together with the first item, a subset of the items similar to the first item, wherein the items in the subset share the one or more attribute values selected by the user, thereby enabling the user to visually compare the first item with the subset of the similar items.

17. The computer readable medium of claim 16, wherein the first item is identified from an origination point associated with the first item.

18. The computer readable medium of claim 17, wherein the origination point is an item detail display.

19. The computer readable medium of claim 18, wherein the subset of items similar to the first identified item is displayed concurrently with the item detail display.

20. The computer readable medium of claim 16, wherein the similarity explorer component is further configured to provide options for ranking the subset of items similar to the first identified item according to an attribute of the first identified item.

* * * * *